United States Patent
Rohrssen et al.

[19]

[11] Patent Number: 5,898,104
[45] Date of Patent: Apr. 27, 1999

[54] FEED ASSEMBLY FOR PACK SEAL TESTER

[75] Inventors: Russell W. Rohrssen; Frank W. Simmons, both of Macon, Ga.

[73] Assignee: Brown & Williamson Tobacco Corp., Louisville, Ky.

[21] Appl. No.: 08/880,820

[22] Filed: Jun. 24, 1997

[51] Int. Cl.[6] .............................. G01M 3/34; B01D 21/28
[52] U.S. Cl. .............................. 73/49.3; 73/827; 209/540; 209/544
[58] Field of Search .................... 73/49.3, 827; 209/598, 209/540, 544

[56] References Cited

U.S. PATENT DOCUMENTS

| | | |
|---|---|---|
| Re. 30,964 | 6/1982 | Butner et al. . |
| 2,991,879 | 7/1961 | Innocenti . |
| 3,939,984 | 2/1976 | Butner et al. . |
| 3,951,049 | 4/1976 | Brackmann et al. ................. 93/39 R |
| 4,053,056 | 10/1977 | Day . |
| 4,156,279 | 5/1979 | Draghetti . |
| 4,530,199 | 7/1985 | Manservisi et al. . |
| 4,930,344 | 6/1990 | Fleenor et al. ............................ 73/49.3 |
| 5,046,242 | 9/1991 | Kuzma ..................................... 29/878 |
| 5,101,609 | 4/1992 | Cook . |
| 5,111,684 | 5/1992 | Stauffer et al. ......................... 73/49.3 |
| 5,156,329 | 10/1992 | Farrell ..................................... 73/49.3 |
| 5,782,734 | 7/1998 | Reuteler ................................. 493/313 |

*Primary Examiner*—Max H. Noori
*Attorney, Agent, or Firm*—Middleton & Reutlinger; Charles G. Lamb

[57] ABSTRACT

A feed assembly for a pack seal tester includes a vertically extending housing having a top opening for receipt of packages therein and a bottom opening for discharge of packages therefrom. The housing includes a feed hopper comprised of two parallel movable opposed spaced C-shaped sidewalls. A piston plate is aligned to remove packages from the bottom opening and into a package test chamber, the package test chamber being in alignment with the bottom opening. The package test chamber includes means to align said packages at a preselected position for testing by a pack seal tester.

9 Claims, 3 Drawing Sheets

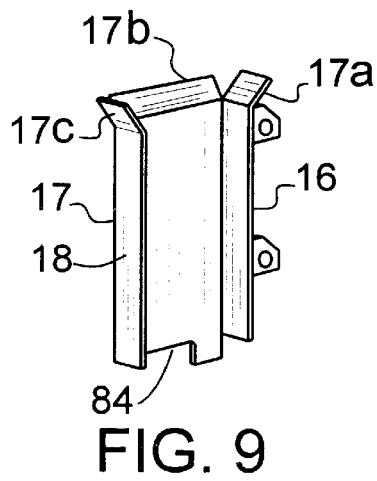
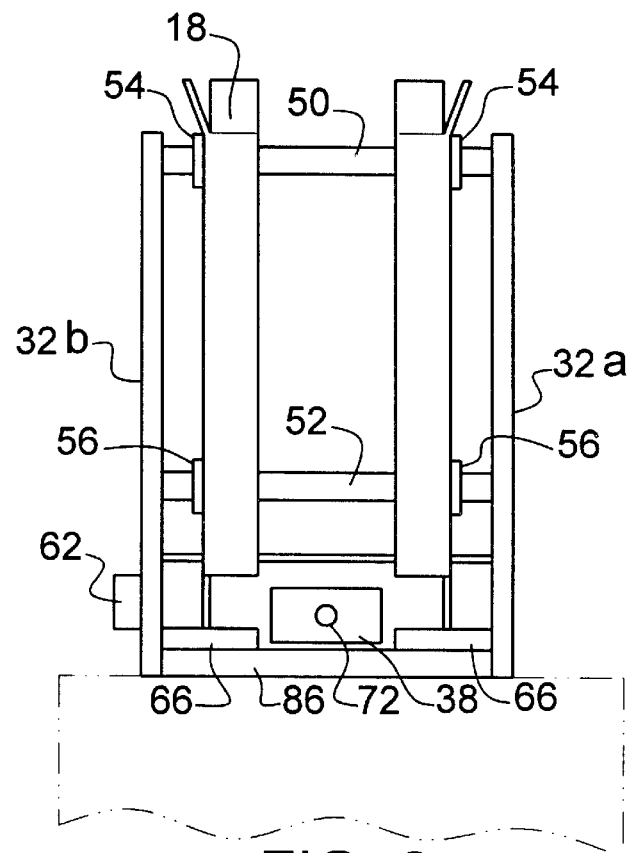
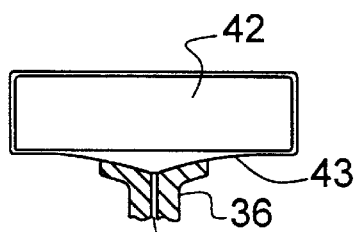
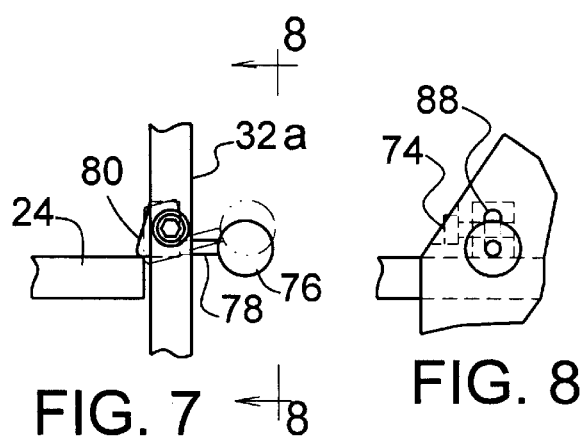

FEED ASSEMBLY FOR PACK SEAL TESTER

BACKGROUND OF THE INVENTION

This invention relates to an automated feed assembly for a manually operated pack seal tester and more particularly relates to an apparatus for automatically feeding packs of cigarettes to a manual pack seal tester which provides for the stacking of a plurality of cigarette packages and advancing the packages to a measuring head of a pack seal tester.

In the manufacturing of a number of products and particularly packages of cigarettes, the packages are wrapped with a transparent film, such as polyethylene or the like. Since the wrapping of these packages occurs at high rates of speed, it is imperative that a close watch be made of products leaving these wrapping machines to see that the wrapped packages conform to preselected specifications. In order to maintain the quality control of these wrapped packages, from time to time operators grab packages for sample testing to determine if the packages have been wrapped to these specific specifications. These grabbed sample packages are taken by the operator and manually placed on the head of a pack seal tester wherein the pack seal tester is provided with a vacuum cup with a vertically movable pin inside the cup which penetrates and breaks the transparent film. A vacuum is then pulled on the package to a preselected psi and if the pack will not withstand a certain pressure, the wrapping machine must be shut down and appropriate adjustments made so that the plastic transparent films will provide for an adequate wrap of the package.

SUMMARY OF THE INVENTION

An object of the present invention is to provide an automated feed assembly for feeding packages of wrapped cigarettes to a pack seal tester.

Another object of the present invention is to provide an apparatus for automatically feeding packs of cigarettes to a pack seal tester including a variable sized chute which allows for stacking of the cigarette packs from the chute and advancing the packs to a measuring head of a pack seal tester.

More particularly, the present invention provides a feed assembly for a pack seal tester comprising: a vertically extending housing having a top opening for receipt of packages therein and a bottom opening for discharge of packages therefrom; means to remove packages from the bottom opening and into a package test chamber; and, a package test chamber in alignment with the bottom opening, the package test chamber being positioned for cooperating relation with a package seal tester.

Further objects and advantages will become apparent to those skilled in the art upon reading of the detailed description of the preferred embodiment set forth hereinafter.

BRIEF DESCRIPTION OF THE DRAWINGS

FIG. 6 is a side view of the feed assembly of FIG. 1;

FIG. 7 is an enlarged view of one component of the preferred embodiment;

FIG. 8 is a sectional view taken along lines 8—8 in FIG. 7;

FIG. 9 is a perspective of another component of the preferred embodiment; and

FIG. 10 is a side view of a cigarette package being tested by a pack seal tester.

DETAILED DESCRIPTION OF THE PREFERRED EMBODIMENT

Figure 2:
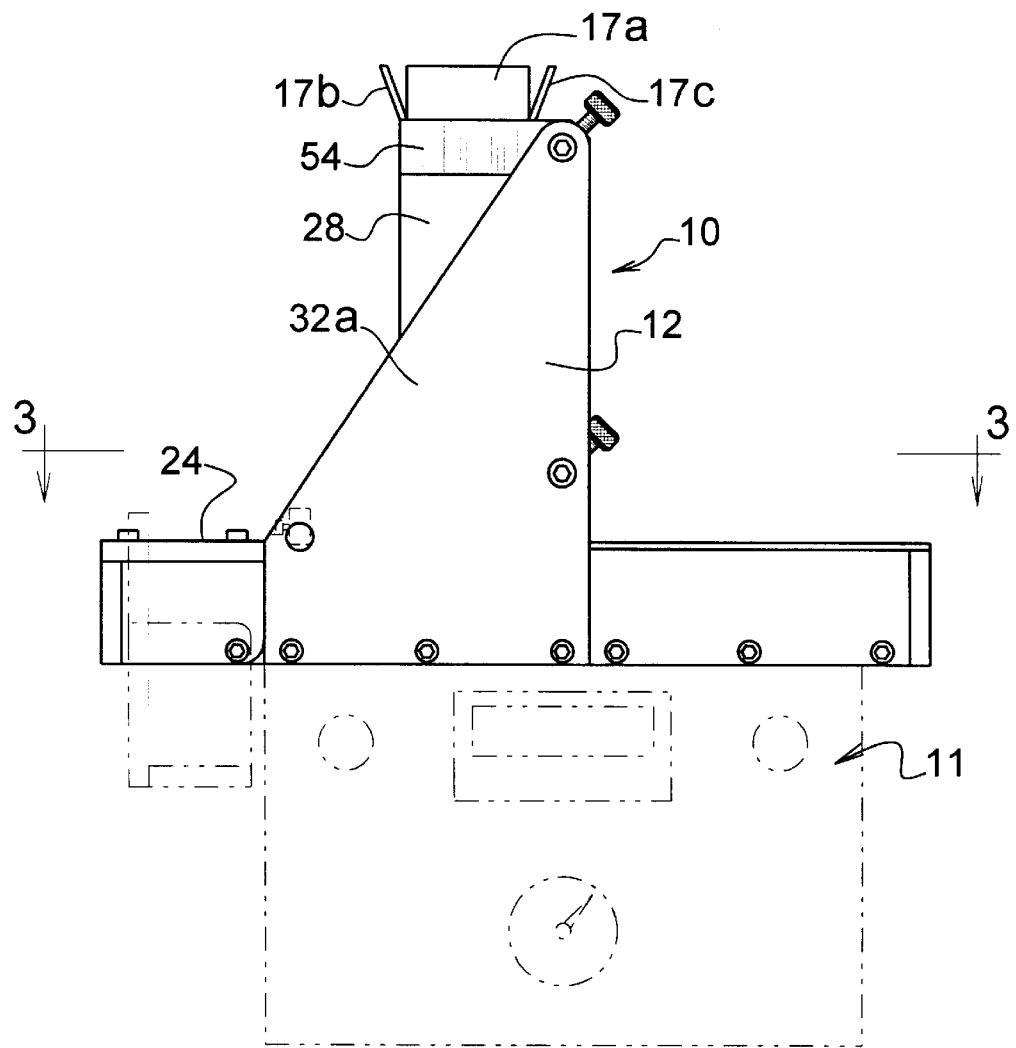
FIG. 2 is an elevational view of the feed assembly of FIG. 1 with a pack seal tester shown in phantom lines.

As shown in the Figures, a pack seal test feed assembly 10 is mounted onto a pack seal tester 11, as shown in phantom lines in FIG. 2. The pack seal tester 11 is a commercially available product, one particularly commercially available being an Arjay Pack Seal Tester manufactured by Fidus Corporation. The pack seal test feed assembly 10 is positioned to feed sealed packages to the pack seal tester 11 for testing the integrity of a film of a wrapper around a package, such as a package of cigarettes.

Figure 1:
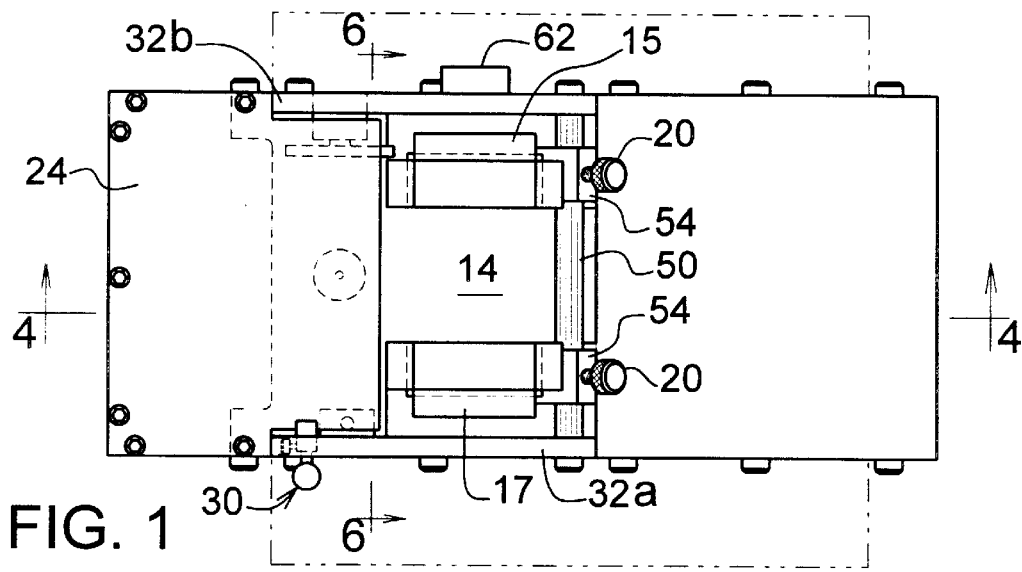
FIG. 1 is a top view of one preferred embodiment of the present invention with a portion of the pack seal tester being shown in phantom lines.

The pack seal test feed assembly 10, as best shown in FIGS. 1 and 2, includes a housing 12 for packages of, for example, cigarettes. The housing 12 is provided with a top opening 14 defined by the upper ends of spaced opposed C-shaped hopper sidewalls 15 and 17. The sidewalls 15 and 17 at their upper ends are provided with angularly outwardly extending flared portions. As shown in FIG. 2, hopper sidewall 17 (a mirror image of sidewall 15) is provided with three upwardly outwardly extending portions 17a, 17b, and 17c. Sidewalls 15 and 17 also define a feed hopper 28 therebetween. Sidewalls 15 and 17 are received by a movable top block member 54 at their upper ends immediately beneath the angularly outwardly extending flared portions, such as sections 17a, 17b and 17c. Housing 12 is further provided with a pair of opposed spaced side plates outwardly of and on opposite sides of the hopper 28, the side plates being identified by the numerals 32a and 32b.

Figure 3:
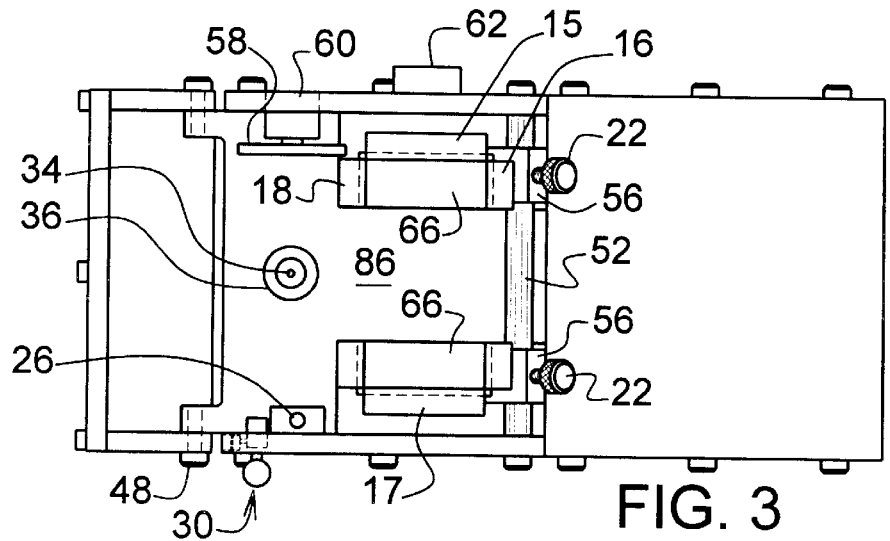
FIG. 3 is a sectional view taken along lines 3—3 of FIG. 2.
Figure 4:
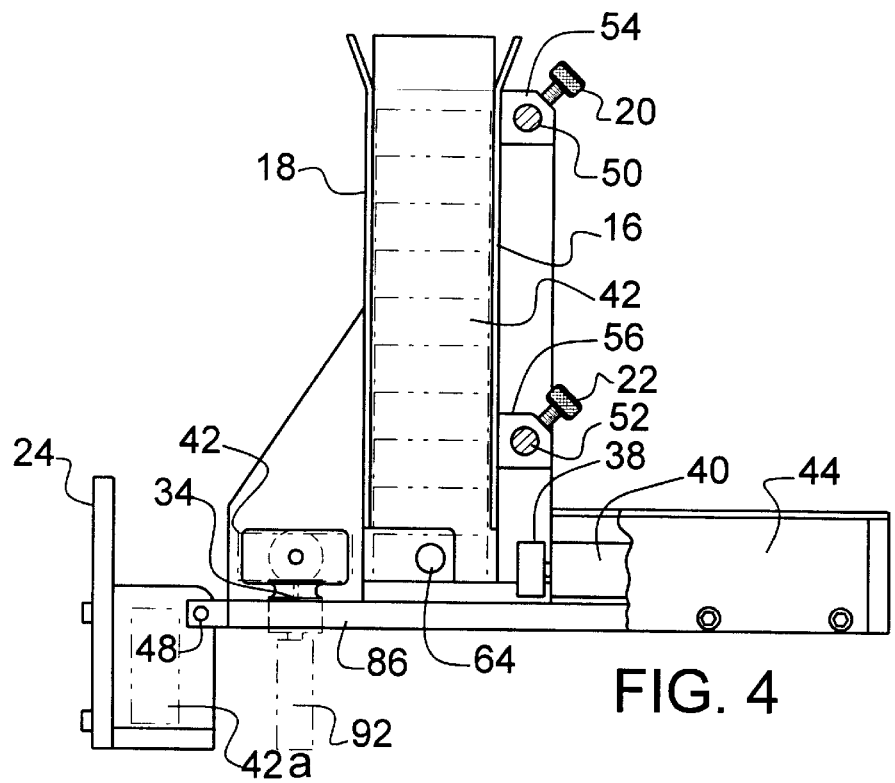
FIG. 4 is a sectional view taken along lines 4—4 of FIG. 1.

Sidewalls 15 and 17, as best shown in FIGS. 3, 4, and 9 are provided with a vertical back portion 16 and a vertical front portion 18. The back portion 16 is in contacting relation with and movable in response to movement of horizontally movable top rod 50 and horizontally movable bottom rod 52. The top rod 50 is movable in response to the top adjustment screws 20 and the bottom rod 52 is movable in response to a bottom adjustment screw 22 which are mounted into top block member 54 and bottom block member 56, respectively.

Figure 5:
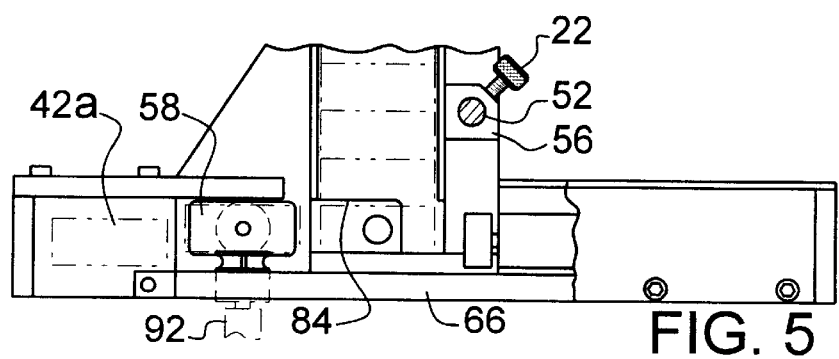
FIG. 5 is a partial view of FIG. 4 showing the door to a package test chamber in a closed position.

As shown in FIGS. 5 and 9, the sidewalls 15 and 17 are provided with cut-outs 84 in a lower portion thereof for removing the packages 42 from the bottom of the hopper 28, cut-outs 84 being aligned on opposite sides of a vacuum cup 36 of the pack seal tester 11. As best shown in FIGS. 3, 4 and 10, the packages removed from the hopper 28 are positioned over the vacuum cup 36 of the pack seal tester 11. Horizontally disposed transverse piston 60, having a press plate 58, is provided for centering the packages over the vacuum cup 36. A movable pin 34 is centrally located within the vacuum cup 36 for piercing the wrapping film 43 on the packages 42 so that a vacuum can be pulled interiorly of the film wrap.

As best shown in FIG. 4, longitudinally movable piston means are provided for moving the packages out of the hopper 28. Outer side plates 44 are provided for housing a piston 40 with a press plate 38 in alignment with the bottom package 42 in the hopper 28. The pack seal test feed assembly 10 is provided with a bottom plate 86 with spacers 66 mounted directly beneath the hopper 28 and on opposite sides of the hopper 28 to receive the packages 42 thereon. Thus, with the spacing between the spacers 66, as shown in FIG. 3, the piston 40 and press plate 38 are positioned, as shown in FIG. 4, to move the lower most package out of the hopper 28 and onto the vacuum cup 36 of the pack seal tester 11.

A LEXAN® plastic door member 24 is pivotally attached to pivot pin 48 for covering a package 42 during a pack seal test. As shown in FIG. 4 the pivotally attached door 24 is in an open position and in FIG. 5, the LEXAN® plastic door member 24 is in a closed position over a pack which is to be tested. Also, a previously tested package 42a, shown in phantom lines, is disposed outside the test area and upon opening the door, as shown in FIG. 4, the package 42a falls downwardly and is caught in the opened door 24. Upon pivotal movement into a closed position of the door 24, the package 42a falls into a hopper or other container (not shown) for discarding or further processing. A plate 62 having an opening 64 therein for "photo sensor" detection of the bottom most package 42 is also provided in the sides of the hopper 28.

As shown in FIG. 3, a micro-switch 26 is disposed in contacting relation with the LEXAN® plastic door member 24 wherein the micro-switch 26 is activated when the LEXAN® plastic door member 24 is in a closed position, micro-switch 26 being in electrical communication with piston 40 to prevent feeding packages 42 to the tester 11 unless door member 24 is closed. A door lock assembly 30 is provided to lock the door member 24 when a package 42 is being tested. And, a sensor 60 is provided to detect the presence of a pack in the lower most position of the hopper 28, this being the package 42 next in line for testing in the pack seal tester 11.

As shown in FIGS. 7 and 8, the door lock assembly 30 is provided with a door keeper 80 which is movable in response to a rod 78 attached to a hand knob 76. Vertical movement of hand knob 76 moves the door keeper 80 from engaging and disengaging relation with an edge of the door member 24. Door keeper 80 is pivotally attached to pivot pin 74 and the rod 78 extends through a slot 88 in response to up and down movement of the hand knob 76.

As shown in FIG. 10, a package 42 is positioned over the vacuum cup 36 and the movable pin 34 penetrates the film thereby creating an opening in the film whereby a vacuum is then pulled through the vacuum cup to a preselected pressure. If the vacuum can be pulled to a preselected pressure then it is determined that the film has sufficient integrity for sale as a commercial product. However, if the preselected vacuum is not obtained, this will show a leak in the film and therefore destroys the integrity of the packaging film.

In operation, a plurality of film wrapped packages are placed into the hopper 28 and the sides of the hopper are adjusted so that the packages are aligned in operating communication with the movable piston plate 38. As packages are to be tested, the movable plate 38 is activated to engage with the bottom most package 42 forcing the package over the vacuum cup 36. Piston press plate 58 then contacts the package and centers the package over the vacuum cup 36. The pivotally attached movable door 24 is then placed into the latching position and the pack seal tester 11 is activated to determine the amount of vacuum that can be pulled on the pack. Upon completion of the test the pivotally attached LEXAN® plastic door 24 is pivoted downward and the next package is placed over the vacuum cup 36 by movement of the pressure plate 38.

Even though only one embodiment of the present invention has been shown and described, it is realized that those skilled in the art may make obvious modifications to the invention without departing from the spirit and scope of the invention as set forth in the claims as appended hereto.

What is claimed is:

1. A feed assembly for a pack seal tester comprising:
   a vertically extending housing having a top opening for receipt of packages therein and a bottom opening for discharge of packages therefrom;
   means to remove packages from said bottom opening and into a package test chamber; and,
   a package test chamber in alignment with said bottom opening, said package test chamber including means to align said packages at a preselected position for testing by a pack seal tester.

2. The feed assembly of claim 1 wherein said housing includes a package feed hopper, said package feed hopper having two spaced movable opposed C-shaped sidewall members.

3. The feed assembly of claim 2, said sidewall members being movable in parallel to each other.

4. The feed assembly of claim 1, said means to remove packages through said bottom opening being an air operated piston.

5. The feed assembly of claim 4, said piston being operated in response to a micro-switch in said package test chamber, said micro-switch being in contacting relation with a package in said package test chamber and actuating said piston when not in contacting relation with a package.

6. The feed assembly of claim 5, said package test chamber having a pivotally attached door for opening and closing said package test chamber.

7. The feed assembly of claim 6, said switch being in a non-actuating condition when said door is in an open position.

8. The feed assembly of claim 1, said package test chamber including means to position said packages over a vacuum cup of said pack seal tester.

9. The feed assembly of claim 8, said means to position said packages over said vacuum cup including a piston operated plate in cooperating relation with said package and operable in response to a package presence testing sensor.

\* \* \* \* \*